(12) United States Patent
Tsang

(10) Patent No.: US 10,317,674 B2
(45) Date of Patent: Jun. 11, 2019

(54) AUGMENTED REALITY SYSTEMS AND METHODS

(71) Applicant: City University of Hong Kong, Kowloon (HK)

(72) Inventor: Wai Ming Peter Tsang, Kowloon (HK)

(73) Assignee: City University of Hong Kong, Kowloon (HK)

( * ) Notice: Subject to any disclaimer, the term of this patent is extended or adjusted under 35 U.S.C. 154(b) by 0 days.

(21) Appl. No.: 15/420,562

(22) Filed: Jan. 31, 2017

(65) Prior Publication Data

US 2018/0217375 A1    Aug. 2, 2018

(51) Int. Cl.
| | |
|---|---|
| *G02B 27/01* | (2006.01) |
| *G03H 1/04* | (2006.01) |
| *G06T 19/00* | (2011.01) |
| *G02B 27/00* | (2006.01) |

(52) U.S. Cl.
CPC ..... *G02B 27/0103* (2013.01); *G02B 27/0093* (2013.01); *G02B 27/0172* (2013.01); *G03H 1/0402* (2013.01); *G06T 19/006* (2013.01); *G02B 2027/0109* (2013.01); *G02B 2027/0174* (2013.01); *G02B 2027/0178* (2013.01); *G03H 2001/0439* (2013.01); *G06T 2200/04* (2013.01); *G06T 2215/16* (2013.01)

(58) Field of Classification Search
None
See application file for complete search history.

(56) References Cited

U.S. PATENT DOCUMENTS

| | | | |
|---|---|---|---|
| 9,341,843 B2 | 5/2016 | Border et al. | |
| 9,372,347 B1 | 6/2016 | Levola et al. | |
| 2011/0102874 A1* | 5/2011 | Sugiyama | G02B 26/101 359/205.1 |
| 2013/0265622 A1* | 10/2013 | Christmas | G02B 27/0103 359/9 |
| 2014/0063055 A1 | 3/2014 | Osterhout et al. | |
| 2014/0098425 A1 | 4/2014 | Schon et al. | |
| 2014/0340286 A1 | 11/2014 | Machida et al. | |
| 2015/0085333 A1* | 3/2015 | Theytaz | G02B 27/017 359/201.2 |
| 2015/0205135 A1* | 7/2015 | Border | G02B 27/0172 359/630 |

* cited by examiner

*Primary Examiner* — Jennifer D. Carruth
(74) *Attorney, Agent, or Firm* — Norton Rose Fulbright US LLP

(57) ABSTRACT

The present disclosure describes Augmented Reality (AR) methods and systems allowing one or more user to observe a virtual image (e.g., computer generated image) overlaid on a physical scene (e.g., actual real life surroundings). Embodiments herein allow components of the AR methods and systems to be decoupled from each other, such that a user is able to view a virtual image overlaid on a physical scene while simply wearing thin, lightweight holographic spectacles.

20 Claims, 3 Drawing Sheets

AUGMENTED REALITY SYSTEMS AND METHODS

TECHNICAL FIELD

Aspects of the present disclosure relate generally to Augmented Reality (AR), and more particularly to systems and methods, which allow components of an AR system to be decoupled.

BACKGROUND

Augmented Reality (AR) overlays virtual images (e.g., synthetic images) onto a physical scene (e.g., the user's actual real life surroundings). AR is different from Virtual-Augmented Reality (VAR), which displays a video image of a physical scene with virtual images overlaid thereon.

Traditional AR systems require users to wear head-mount devices (HMD) or near-eye display terminals, which are complicated, heavy, and bulky due to their electronic projectors and displays, electronic circuits, optical accessories (e.g., lenses, beam-splitters, prisms, mirrors, etc.), and power supplies. As such, existing AR systems are cost prohibitive, excessively heavy after prolonged use, and tend to cause stress to the user's eyes, neck, and shoulders.

In general, AR systems comprise a head mount and/or helmet, which straps onto the user's head and over their eyes. Traditional AR helmets include a rear projector unit, a micro-display, and a viewing plane, which is at least partially transparent. The rear projector, which is behind the user's line of vision, projects virtual images onto the micro-display, which is located above the user's line of vision (e.g., near the user's eye brows). The virtual image is then projected from the micro-display onto the viewing plane, which is within the user's line of vision. In order to route the virtual image as described, the AR system uses a complicated optical guiding system comprising beam-splitters, prisms, lenses, mirrors, and other cumbersome optical accessories. Of course, the more sophisticated the virtual image is, the more complicated the optical guiding system becomes.

Further, to facilitate comfort, the viewing plane should be located near the user's eyes. However, to allow the user's eyes to properly focus on the virtual image, the source of the projected image should be located sufficiently far away from the micro-display. Traditional AR systems solve this paradox using additional optical elements and accessories, thereby further increasing the weight, size, bulk, complexity, power consumption, and cost of the AR system.

While AR may be more prolifically used in commercial settings (e.g., product design), users desire AR for recreational and/or personal uses such as overlaying virtual images and virtual messages on a physical scene while reading a book, watching TV, viewing an exhibition (e.g., art), etc. Although users may tolerate complicated and bulky AR systems in commercial settings because an employer requires the bulky system's use, these bulky AR systems impose a barrier toward long term sustainability of the technology, especially for recreational or casual uses.

SUMMARY

The present disclosure describes Augmented Reality (AR) methods and systems that allow one or more user to observe a visible virtual image (e.g., synthetic image, computer generated image (CGI), picture, text, message, etc.) overlaid on a physical scene (e.g., actual real life surroundings). Methods herein allow components of the AR system to be decoupled from each other, such that a user is able to view a visible virtual image overlaid on a physical scene while simply wearing thin, lightweight holographic spectacles.

The holographic spectacles may be free from electronic devices, optical accessories, and a power source. Methods disclosed herein provide an AR system having significant advantages over traditional AR systems at least because the user is able to simply wear lightweight, compact spectacles, which can be manufactured at a low cost and in large quantities. Such advantages overcome a number of critical issues traditional AR systems face including discomfort, complexity, weight, cost, etc. Thus, embodiments herein carry a strong impact in the technology roadmap of AR technology.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosure, reference is made to the following FIGURES taken in conjunction with their accompanying descriptions.

DETAILED DESCRIPTION

Figure 1:
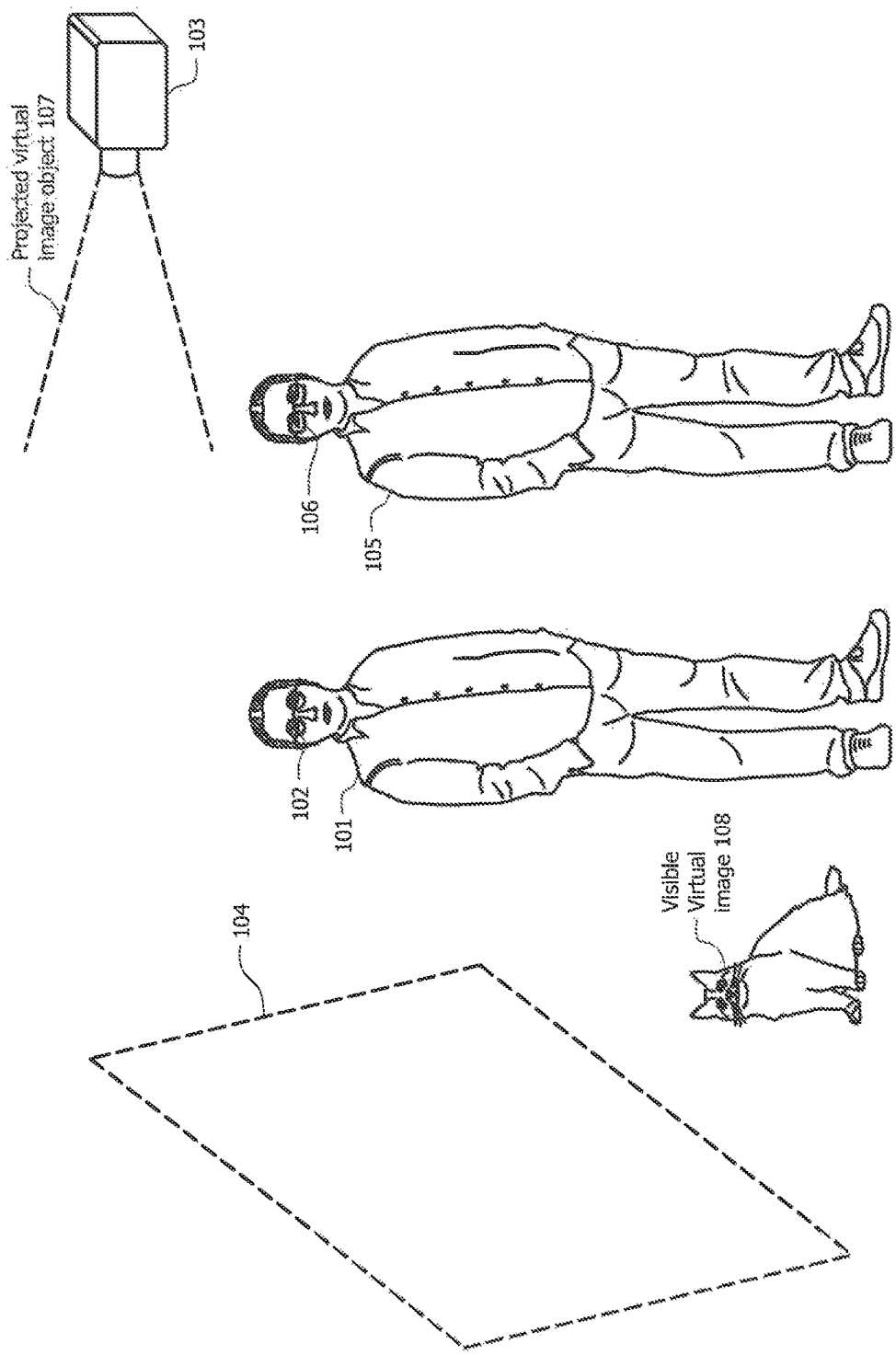
FIG. 1 is an illustration of an example AR system and method.

The present disclosure describes Augmented Reality (AR) systems and methods having components that may decouple (disconnect, detach, disengage, uncouple, etc.) and/or otherwise be isolated and/or separated from each other, such that one or more user may wear and/or carry one, some, or all of the components while viewing a visible virtual image 108 overlaid on a physical scene. FIG. 1 shows an example AR system including a holographic plane 102, a backdrop plane 104, and a virtual image projector 103.

The virtual image projector 103 projects a projected virtual image 107 onto the backdrop plane 104. The projected virtual image 107 may be refreshed and/or changed as desired. Examples of a virtual image projector 103 include but are not limited to a Liquid Crystal Display (LCD), a Liquid Crystal on Silicon (LCoS), or a micromirror device (DMD) (e.g., DLP projection technology) that is illuminated by a coherent beam. Another example is a laser scanning projector. Further, a virtual image projector 103 may be a handheld communications device such as a cell phone, tablet, laptop, smart phone, smart watch, etc. and/or attachable component thereof. The virtual image projector 103 may be coupled to other components of the AR system if desired. Alternatively, virtual image projector 103 may be decoupleable from other components of the AR system if desired. In embodiments, the virtual image projector 103 may be worn and/or carried by the user 101. In other embodiments, the virtual image projector 103 may not be worn or carried by the user. For example, the virtual image projector 103 may be mounted to a wall, ceiling, desk, another person, a robot and/or other moveable vehicle, etc. The virtual image projector 103 may be stationary and/or mobile.

The AR system also includes at least one holographic plane 102. In embodiments, the holographic plane 102 is a holographic monocle or holographic planes may be holographic spectacles 102 that are worn by a user 101. Because components of the AR system are able to function properly while being disconnected from each other, the user 101 may simply wear thin, lightweight holographic spectacles 102 while viewing one or more visible virtual image 108 overlaid on the user's 101 physical scene. The holographic spectacles 102 may be free from electronic devices and optical accessories. In embodiments, when the AR system is not activated, the holographic spectacles 102 may operate as transparent glasses that allow the viewer to observe the physical scene with no overlaid visible virtual image 108.

The holographic spectacles 102 may be corrective glasses (e.g., prescription glasses, reading glasses, sun glasses, etc.) in that the holographic spectacles 102 improve the user's vision regardless of whether the AR system is activated. The holographic spectacles 102 may be implemented by printing a hologram thereon. For example, the printed hologram may be a regular array of dots and/or patterns that are printed onto the transparent mediums of the spectacles. An example is to coat a thin layer of metal onto a transparent glass substrate and etch a hologram pattern from the metal layer. Other methods include printing the hologram pattern onto a transparent substrate with a high resolution printing device.

While the holographic spectacles may couple as corrective glasses, holographic spectacles 102 have no need for optical augmenting lenses. Specifically, no focusing lenses are required for focusing the visible virtual image 108. As such, the holographic spectacles 102 may be vanity glasses in that the spectacles provide no improvement to the user's vision regardless of whether the AR system is activated. Further, the holographic spectacles 102 may be polarized or non-polarized as is desired. For example, a user 101 may desire non-polarized holographic spectacles 102 such that when a physical scene includes screens (e.g., LCD screens), the view of the physical scene is not negatively affected by polarization.

In embodiments, the holographic spectacles 102 may not be communicably and/or electronically connected to the virtual image projector 103. For example, the holographic spectacles 102 may exclude wired or wireless connections with the virtual image projector 103 and/or any other device if desired. Alternatively, in embodiments, the holographic spectacles 102 may include wired or wireless connections that communicate with the virtual image projector 103 and/or other devices. In embodiments, the holographic spectacles 102 are not connected to the backdrop plane 104. In embodiments, a head or eye tracking mechanism may be incorporated to steer the projected virtual image 107 projected by the virtual image projector 103, thereby allowing the visible virtual image 108 to maintain the same position upon movement of the user 101. The tracking mechanism may be incorporated into the holographic spectacles 102, and/or the virtual image projector 103, and/or the backdrop plane 104, and/or be separate from all of the above. In such embodiments, one or more of the components (e.g., holographic spectacles 102, virtual image projector 103, backdrop plane 104, and/or the tracking mechanism) may be in communication with each other using a wired or wireless connection.

In embodiments, the one or more virtual image projector 103 may project projected virtual image 107 having a left component and a right component (which could be identical content or different content), each generating a visible virtual image 108 that is visible to the corresponding eye through the holographic spectacles 102. Such an embodiment provides stereoscopic 3-D perception to the user 101. Further, the projected virtual image 107 may have any number of components, for example, an upper component, middle component, lower component, lowest component, furthest right component, furthest left component, and more.

In embodiments, a second user 105 may wear second holographic spectacles 106 and have the same or similar viewing experience as the first user 101. The second user 105 wearing second holographic spectacles 106 may have a different viewing experience as the first user 101. Of course, any number of users wearing holographic spectacles could view one or more visible virtual image overlaid on the users' physical scene.

The AR system also includes a backdrop plane 104. The backdrop plane 104 may be a screen that is placed between the virtual image projector 103 and the observer 101. In operation, the observer 101 wears the spectacles 102 and faces the direction of the backdrop plane 104. In general, the backdrop plane 104 may be at a higher vertical level than the eyes so that backdrop plane 104 is less noticeable or not visible when the user 101 is looking straight ahead. The backdrop plane 104 could be the surface of a wall, the surface of a screen, the surface of an object, etc. In embodiments, backdrop plane 104 may be attached to the user 101 wearing the holographic spectacles 102 and/or attached to the holographic spectacles 102. In embodiments, backdrop plane 104 is not attached to the user 101 or the holographic spectacles 102.

In embodiments, the backdrop plane 104 could be inclined at a certain angle θ with reference to the holographic plane 102. In such an example, the holographic plane 102 may be a stationary holographic plane 102. Alternatively, if the holographic plane 102 (e.g., holographic spectacles 102) is dynamically moveable, the backdrop plane 104 may also be dynamically movable such that the certain angle θ is maintained, or maintained within a certain range, despite the dynamic movement of the holographic plane 102. The projected virtual image 107 may be geometrical transformed beforehand so that a shape changing effect caused by an inclination of the backdrop plane 104 may be reduced. In embodiments, the backdrop plane 104 and the projected virtual image 107 are outside the line of vision of the user 101. When the AR system is activated, the projected virtual image 107 may be displayed at a position in the environment at which the eyes of the user 101 can focus on the visible virtual image 108 (e.g., a cat) and observe the visible image object 108.

Figure 2:
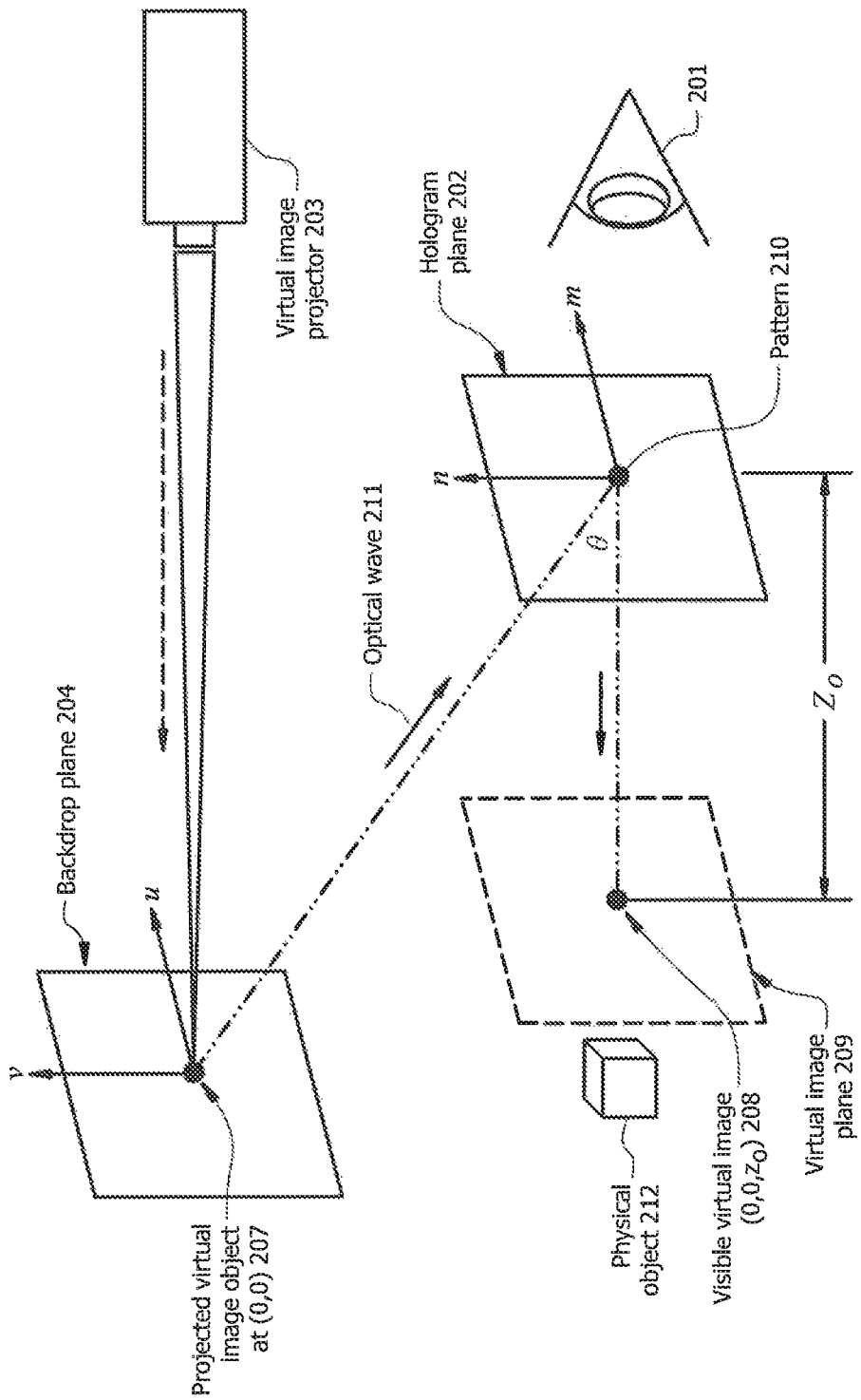
FIG. 2 is an example AR system and method.

For simplicity of explanation, FIG. 2 shows an example of overlaying a simple virtual image (e.g., visible virtual dot) onto a physical object (e.g., box 212), wherein the box 212 is part of the user's physical scene (e.g., actual real life surroundings). It is understood that the same principle can be applied to overlaying a visible patterned virtual image (e.g., a cross, hand, message, animal 108, and the like) onto any physical object 212 in the user's physical scene.

In FIG. 2, a thin transparent holographic plane 202 is placed at a close proximity before one or both of the user's eye or eyes 201. For example, the user may wear holographic spectacles 102. The virtual image projector 202 projects a projected virtual image 207 (e.g., a projected virtual dot) at backdrop plane 204. One or more processor (e.g., a virtual image generator) generates the projected virtual image 207, which is projected by virtual image projector 202. The one or more processor may be included within virtual image projector 202 and/or be remote therefrom. The one or more processor may be a computer, smart phone, server, or the like, and may communicate with virtual image projector 202 via LAN, WAN, the Internet, eNodeB, femtocell, picocell, wirelessly, wired connection, and/or the like.

The backdrop plane 204 could be the surface of a wall, the surface of a screen, the surface of an object, etc. The projected virtual image 207 may be beyond the field of vision of the user. The projected virtual image 207 hits the backdrop plane 204 and scatters one or more optical wave 211. One or more optical wave 211 scattered from the projected virtual image 207 impinges the holographic plane 202 having hologram 210 thereon. When optical wave 211 impinges on hologram 210, visible virtual image 208 will be viewable through holographic plane 202 at an axial distance $z_o$ from the holographic plane 202. The distance $z_o$ may be set larger than the minimum viewing distance of a typical user, so that visible virtual image 208 within the virtual image plane 209 appears to the user to be merged with the physical scene.

In this example, holographic plane 202 has a hologram 210, which is a pattern of a regular array of dots, printed thereon. For example, hologram 210 is recording an image of a regular array of patterns. FIG. 2 shows a simplified example wherein if one dot is projected on backdrop plane 204, the viewer will see a corresponding dot through the spectacles. Further, if there are two dots projected on backdrop plane 204, the viewer will see two corresponding dots through the spectacles. In the same way, when multiple dots are projected on backdrop plane 204, the viewer will see multiple corresponding dots through the spectacles. Of course, the projected dots may be specifically patterned so that specific corresponding dots are viewed through the spectacles, thereby causing the user 201 to see a specific visible virtual image 208 (e.g., hand, animal, cat, car, tree, etc.).

Generation of the hologram for producing an example visible dot (e.g., visible virtual image 208) at $z_o$ is outlined as follows. First, the object wave of a single dot is computed as given by $$O(m, n) = \exp\left[\frac{i2\pi}{\lambda}\sqrt{(m\delta)^2 + (n\delta)^2 + z_o^2}\right] \quad (1)$$

where δ is the pixel size of the hologram, λ is the wavelength of a coherent beam, and i is the imaginary operator. Subsequently, an off-axis hologram representing the dot image is obtained by multiplying the object wave with a plane wave R(n;θ) that is inclined at an angle θ along the vertical direction as $$H(m,n)=O(m,n)\times R(n) \quad (2)$$

where $$R(n) = \exp\left[\frac{i2\pi}{\lambda}\sin(\theta)\right].$$

For example, the off-axis hologram may be obtained by multiplying an object wave of the image of regular patterns (for example image of regular spaced dot patterns) with a plane wave that is inclined at an angle. The hologram can be further converted into an amplitude-only hologram by discarding the imaginary component.

$$H_R(m,n)=Re[H(m,n)] \quad (3)$$

Alternatively, the hologram can be converted into a phase-only hologram by preserving only the phase component, as $$H_P(m,n)=\arg[H(m,n)] \quad (4)$$

An amplitude or a phase-only hologram can be written on a substrate (e.g., a photo film or a glass plate that is coated with a thin metal layer and etched), forming hologram plane 202 of the AR system. When the hologram plane 202 is impinge with optical wave 211 of the projected virtual image 207 at an angle θ as shown in FIG. 2, the optical wave 211 reflects off hologram plane 202 and a visible virtual image 208 of the dot will appear on the virtual image plane 209, and at a distance $z_o$ from the hologram plane 202.

FIG. 2 illustrates one possible spatial configuration of proposed AR methods and systems. It is understood that in embodiments virtual image plane 209 may be closer and/or farther away from backdrop plane 204, which may be closer and/or farther away from hologram plane 202. Further, because the AR system leverages the projected virtual image's 207 scattered optical waves, the present system is different from projection mapping because there is no need to project the visible virtual image 208 on the physical object 212 of which the visible virtual image 208 is overlaid (e.g., no need to project the virtual dot 208 onto the physical box 212).

Figure 3:
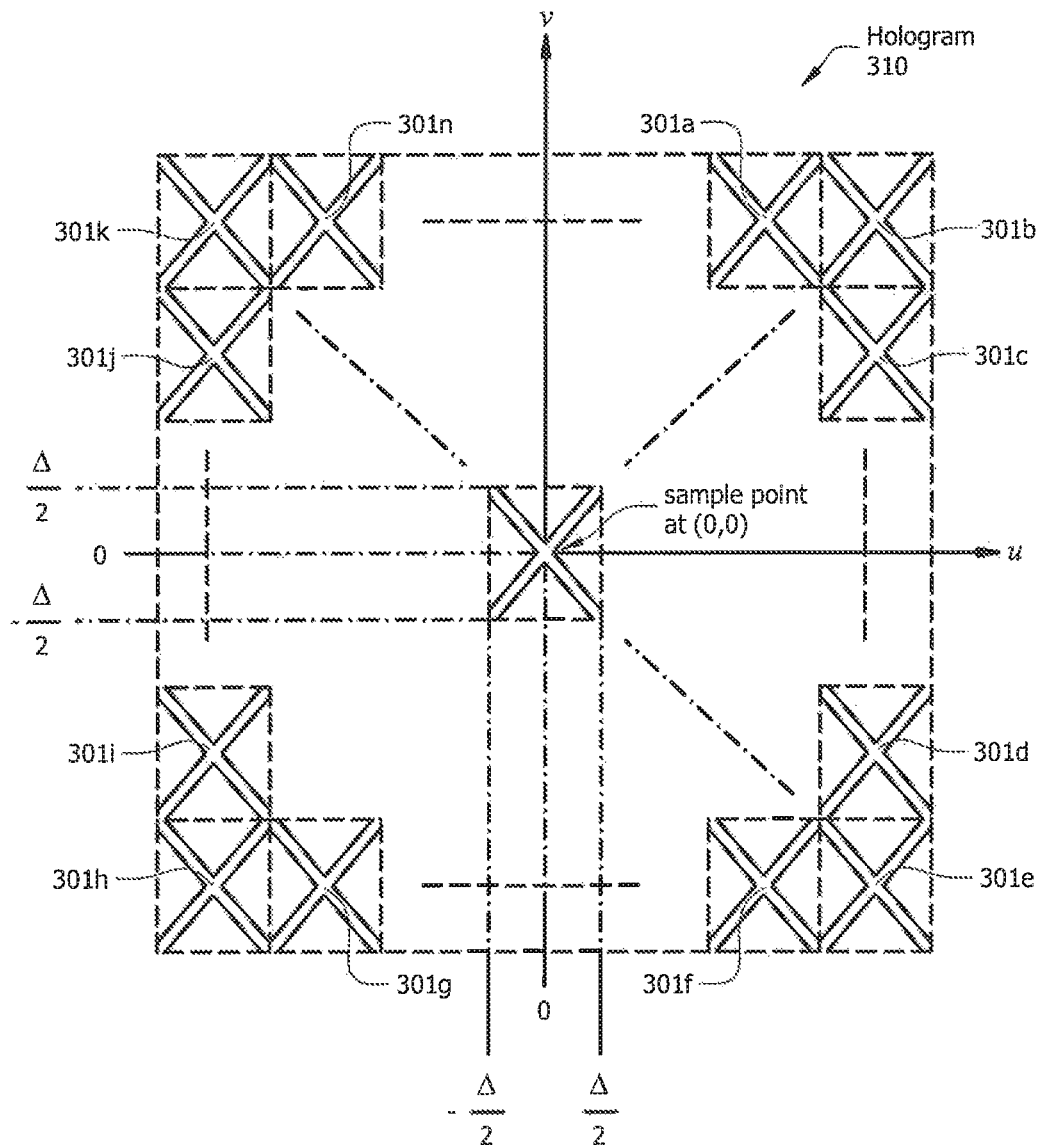
FIG. 3 is an example hologram pattern for use in AR systems and methods.

The above example describes the formation of a single visible virtual dot image 208 at the center of the virtual image plane 209. In embodiments, a 2-D planar image comprising of multiple dots may be projected onto the backdrop plane 204 by the virtual image projector 202. For each projected virtual dot image 207 that is positioned at (p,q) on the backdrop plane 204, an additional hologram is present on hologram plane 202 and displayed as a visible virtual dot image 208 at the corresponding position on the virtual image plane 209. To display desired dot patterns on a sampling lattice with X columns and Y rows of sampling points, the combined object wave $O_C(m,n)$ representing a regular array of dot patterns on the sampling lattice shown in FIG. 3 is computed as given by $$O_C(m, n) = \sum_{x=-\frac{X}{2}}^{\frac{X}{2}-1} \sum_{y=-\frac{Y}{2}}^{\frac{Y}{2}-1} O(m - x\Delta, n - y\Delta) \quad (5)$$

where Δ is the sampling interval.

Next, an off-axis hologram that is inclined at an angle θ is generated as $$H_C(m,n)=O_C(m,n)\times R(n) \quad (6)$$

From the hologram, an amplitude or a phase-only hologram can be obtained as $$H_{CR}(m,n)=Re[H_C(m,n)], \quad (7)$$

and $$H_{CP}(m,n)=\arg[H_C(m,n)], \quad (8)$$

respectively. The amplitude hologram $H_{CR}(m,n)$ or the phase-only hologram $H_{CP}(m,n)$ can be printed, produced, hard-copied, written, and the like onto a substrate that is the hologram plane 202 of the AR system. As previously explained, the same principle can be applied when replacing the dot example of hologram 210 with example hologram 310 such as, but not limited to, crosses as shown in FIG. 3, which shows crosses 301a-301n.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various methods, algorithms, and components described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. Moreover, the scope of the present application is not intended to be limited to the particular embodiments of the process, machine, manufacture, composition of matter, means, methods and steps described in the specification.

What is claimed is:

1. An augmented reality system comprising:
   a virtual image projector operable to project a projected virtual image; and
   spectacles including at least one transparent hologram plane comprising a hologram printed thereon,
   wherein at least one optical wave scattered from the projected virtual image reflecting off a backdrop plane impinges a portion of the hologram printed on the at least one transparent hologram plane,
   wherein the impinged portion of the hologram causes a visible virtual image to be viewable by a user in the user's actual surroundings while looking through the at least one transparent hologram plane, and
   wherein the spectacles are devoid of electronics.

2. The augmented reality system of claim 1 wherein the hologram is recording an image of a regular array of patterns.

3. The augmented reality system of claim 2 wherein the hologram printed on the at least one transparent hologram plane is an off-axis hologram.

4. The augmented reality system of claim 3 wherein the off-axis hologram is obtained by multiplying an object wave of the image of the regular array of patterns with a plane wave that is inclined at an angle.

5. The augmented reality system of claim 1 wherein the hologram printed on the at least one transparent hologram plane is an amplitude-only hologram.

6. The augmented reality system of claim 1 wherein the hologram printed on the at least one transparent hologram plane is a phase-only hologram.

7. The augmented reality system of claim 1 wherein the spectacles are devoid of a power source.

8. The augmented reality system of claim 1 further comprising:
   one or more processors that generates the projected virtual image that is projected by the virtual image projector.

9. The augmented reality system of claim 8 wherein the projected virtual image is sent to the virtual image projector via a wireless user device.

10. The augmented reality system of claim 1 wherein the visible virtual image is a 3D image.

11. A method that overlays a visible virtual image, which is viewable by a user, in the user's actual surroundings, the method comprising:
   providing spectacles including a hologram plane comprising a hologram printed thereon;
   projecting a projected virtual image onto a backdrop plane resulting in optical waves being scattered off the backdrop plane; and
   receiving, on the hologram plane, at least one of the optical waves that impinges a portion of the hologram printed on the hologram plane,
   wherein the at least one of the optical waves impinging the portion of the hologram causes the visible virtual image to be viewable by the user in the user's actual surroundings while looking through the hologram plane, and
   wherein the spectacles are devoid of electronics.

12. The method of claim 11 wherein the hologram is recording an image of a regular array of patterns.

13. The method of claim 12 wherein the hologram printed on the hologram plane is an off-axis hologram.

14. The method of claim 13 wherein the off-axis hologram is obtained by multiplying an object wave of the image of the regular array of patterns with a plane wave that is inclined at an angle.

15. The method of claim 11 wherein the hologram printed on the hologram plane is an amplitude-only hologram.

16. The method of claim 11 wherein the hologram printed on the hologram plane is a phase-only hologram.

17. The method of claim 11 wherein the spectacles are devoid of a power source.

18. The method of claim 11 further comprising:
   generating the projected virtual image that is projected by a virtual image projector.

19. The method of claim 18 wherein the generated projected virtual image is sent to the virtual image projector via a wireless user device.

20. The method of claim 11 wherein the visible virtual image is a 3D image.

* * * * *

UNITED STATES PATENT AND TRADEMARK OFFICE
CERTIFICATE OF CORRECTION

PATENT NO. : 10,317,674 B2
APPLICATION NO. : 15/420562
DATED : June 11, 2019
INVENTOR(S) : Wai Ming Peter Tsang Page 1 of 1

It is certified that error appears in the above-identified patent and that said Letters Patent is hereby corrected as shown below:

In the Specification

At Column 6, Line number 5, delete the portion of the equation reading "$i2\pi$" and replace with --$i2\pi n$--.

Signed and Sealed this
Thirtieth Day of July, 2019

Andrei Iancu
*Director of the United States Patent and Trademark Office*